US012743611B2

(12) United States Patent
Uniyal et al.

(10) Patent No.: US 12,743,611 B2
(45) Date of Patent: Sep. 22, 2026

(54) HYBRID NEURAL NETWORK SYSTEM WITH MULTI-THREADED INPUTS

(71) Applicant: Bank of America Corporation, Charlotte, NC (US)

(72) Inventors: Rahul Uniyal, Dehradun Uttarakhand (IN); Mohit Dhingra, Hyderabad Telangana (IN); Anuja Savant, Mumbai (IN); Srikanth Vemula, Hyderabad Telangana (IN); Namrata Kurmi, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 953 days.

(21) Appl. No.: 17/965,080

(22) Filed: Oct. 13, 2022

(65) Prior Publication Data

US 2024/0135154 A1 Apr. 25, 2024

(51) Int. Cl.

*G06N 3/063* (2023.01)
*G06F 40/20* (2020.01)
*G06N 3/08* (2023.01)

(52) U.S. Cl.

CPC ............. *G06N 3/063* (2013.01); *G06F 40/20* (2020.01); *G06N 3/08* (2013.01)

(58) Field of Classification Search

CPC ........... G06F 40/20; G06F 40/30; G06N 3/08; G06N 3/045

See application file for complete search history.

(56) References Cited

U.S. PATENT DOCUMENTS

| | | | |
|---|---|---|---|
| 7,805,377 | B2 | 9/2010 | Felsher |
| 8,468,244 | B2 | 6/2013 | Redlich et al. |
| 8,504,456 | B2 | 8/2013 | Griffin et al. |
| 8,755,837 | B2 | 6/2014 | Rhoads et al. |
| 9,323,935 | B2 | 4/2016 | Condry et al. |
| 9,678,949 | B2 | 6/2017 | Monk, II et al. |

(Continued)

FOREIGN PATENT DOCUMENTS

| | | |
|---|---|---|
| EP | 2673777 | 12/2018 |
| JP | 6732806 | 7/2020 |

OTHER PUBLICATIONS

Zhang, et al. “Cat: Beyond efficient transformer for content-aware anomaly detection in event sequences.” (Aug. 2022) (Year: 2022).*

(Continued)

*Primary Examiner* — Michelle T Bechtold
*Assistant Examiner* — Matiyas T Maru
(74) *Attorney, Agent, or Firm* — Weiss & Arons LLP

(57) ABSTRACT

Systems and methods for predicting application failures using a hybrid neural network with multi-threaded inputs are provided. A method includes storing, in a first database, information relating to a plurality of digital applications, and storing, in a second database, information relating to historical performance issues associated with the plurality of digital applications. The method may include training the hybrid neural network according to the particulars disclosed herein. The method may also include detecting a trigger event relating to one of the plurality of digital applications, and via the particulars disclosed herein, using the hybrid neural network to output a set of predicted application failures.

20 Claims, 5 Drawing Sheets

(56) References Cited

U.S. PATENT DOCUMENTS

| | | | | |
|---|---|---|---|---|
| 9,734,169 | B2 | 8/2017 | Redlich et al. | |
| 9,984,111 | B2 * | 5/2018 | Fillipi | G06F 16/2343 |
| 10,318,740 | B2 | 6/2019 | Toledano et al. | |
| 11,218,498 | B2 * | 1/2022 | Hajimirsadeghi | H04L 63/1408 |
| 11,488,041 | B2 * | 11/2022 | Mehta | G06N 5/045 |
| 11,703,826 | B1 * | 7/2023 | Dean | G06F 16/27 |
| 11,748,568 | B1 * | 9/2023 | Orhan | G06F 40/284 |
| 2017/0293542 | A1 * | 10/2017 | Xu | G06F 11/2263 |
| 2021/0110475 | A1 * | 4/2021 | Singh | G06Q 30/0282 |
| 2021/0133535 | A1 * | 5/2021 | Zhao | G06N 3/04 |
| 2021/0248671 | A1 * | 8/2021 | Yang | G06Q 20/065 |

OTHER PUBLICATIONS

Xiangnan He et al., "Neural Collaborative Filtering," https://arxiv.org/abs/1708.05031, Aug. 26, 2017.
Ashish Vaswani et al., "Attention Is All You Need," https://arxiv.org/pdf/1706.03762.pdf, Dec. 6, 2017.
Chenguang Wang et al., "Language Models are Open Knowledge Graphs," https://arxiv.org/pdf/2010.11967.pdf, Oct. 22, 2020.
Weiwei Guo et al., "DeText: A Deep Text Ranking Framework with BERT," https://arxiv.org/pdf/2008.02460.pdf, Aug. 6, 2020.

* cited by examiner

HYBRID NEURAL NETWORK SYSTEM WITH MULTI-THREADED INPUTS

FIELD OF TECHNOLOGY

Aspects of the disclosure relate to digital systems. Specifically, aspects of the disclosure relate to neural network systems.

BACKGROUND OF THE DISCLOSURE

Performance issues often arise in digital systems—especially in large, complex, digital systems. The root causes of the performance issues are numerous and varied. Root causes may, for example, relate to factors associated with technology, platform, application integration, business domain, application history, developers, etc.

Typically, the root cause of an issue is discovered after the issue occurs. Moreover, discovering the root cause of an issue often requires an intensive scan of voluminous code. Discovering the root cause after an issue occurs, and/or conducting an intensive scan of voluminous code to discover the root cause, can lead to significant financial and security losses associated with the digital system.

It would be desirable, therefore, to provide systems and methods for preemptively predicting system failures. It would be further desirable to discover the root cause of a system failure without the need to conduct a comprehensive code scan.

SUMMARY OF THE DISCLOSURE

Aspects of the disclosure relate to systems and methods for hybrid neural networks with multi-threaded inputs for predicting application failures. A system may include a first database configured to store information relating to a plurality of digital applications. The system may also include a second database configured to store information relating to historical performance issues associated with the plurality of digital applications. The system may also include a hybrid neural network. The hybrid neural network may include a transformer block neural network, and a natural language processing (NLP) engine that is separate from the transformer block neural network.

The hybrid neural network may be trained by: generating a first representation of the information in the first database; generating a second representation of the information in the second database; generating, via an embedding algorithm, a first information vector from the first representation; generating, via the embedding algorithm, a second information vector from the second representation; feeding, using a masking algorithm, the first and the second information vectors to the transformer block neural network; and feeding the second representation to the NLP engine.

The system may be configured to: detect a trigger event relating to one of the plurality of digital applications; receive information relating to the trigger event; generate a third representation of the information relating to the trigger event; generate, via the embedding algorithm, a third information vector from the third representation; feed the third information vector to the transformer block neural network; receive a first output from the transformer block neural network; feed the third representation to the NLP engine; receive a second output from the NLP engine; feed the first and the second outputs to a neural collaborative filtering engine; and receive, as output from the neural collaborative filtering engine, a set of predicted application failures.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
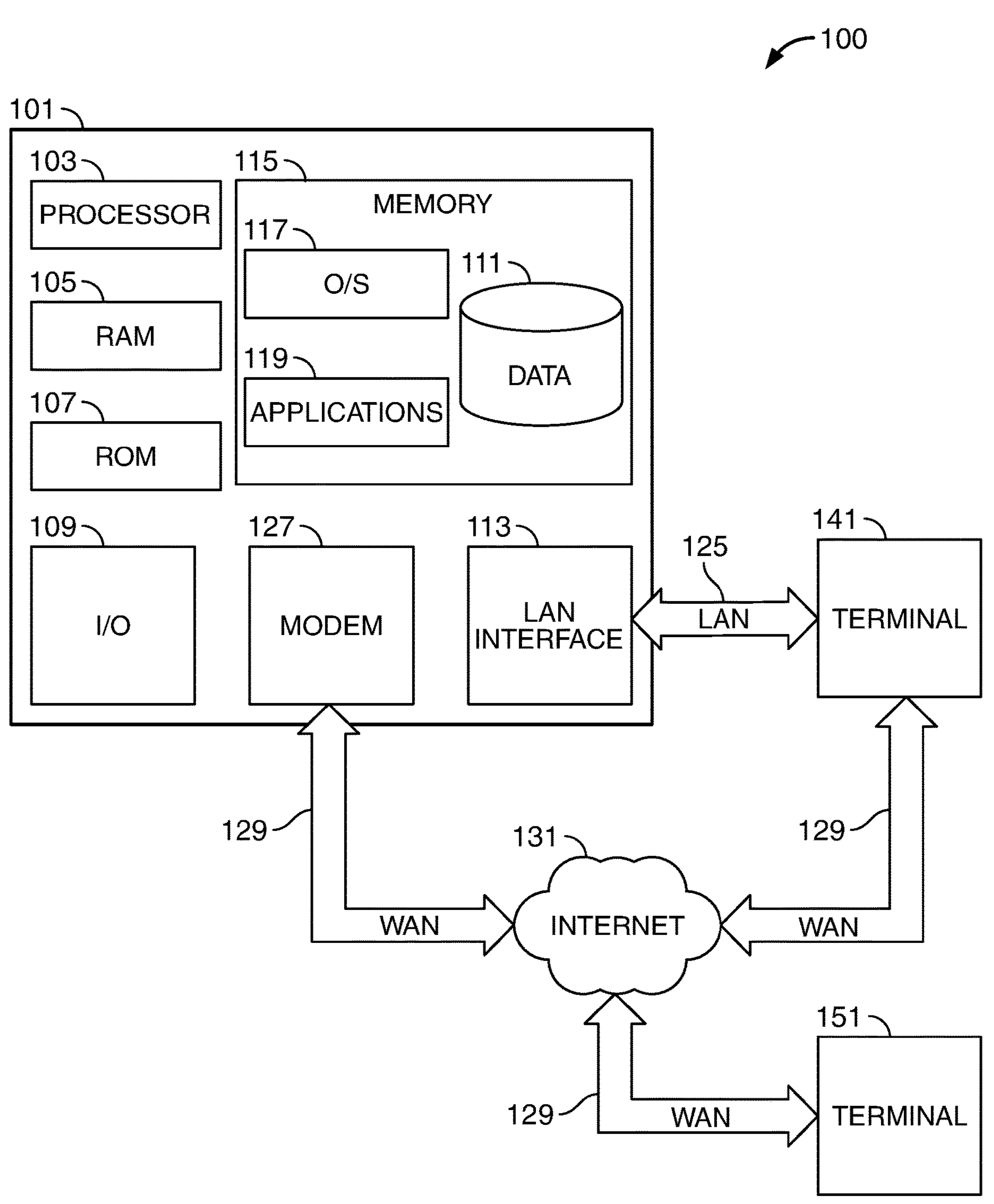
FIG. 1 shows an illustrative system in accordance with principles of the disclosure.

Aspects of the disclosure relate to systems and methods for hybrid neural networks with multi-threaded inputs for predicting application failures. System features and configurations disclosed herein may correspond to method steps of the disclosure. A system may include a first database configured to store information relating to a plurality of digital applications. The information may, for example, include documentation, manuals, instructions, and/or any other suitable information that may describe how an application works or how an application is supposed to be used. The information may relate to aspects of business, technology, platform specifics, user or developer information, or any other suitable information that may be a factor in contributing to an application failure. The information may, in certain preferred embodiments, be text-based.

The system may also include a second database configured to store information relating to historical performance issues associated with the plurality of digital applications. Performance issues as used herein may refer to any undesirable effect on the performance of the system. For example, performance issues may include partial or complete breakdowns of system speed, availability, connectivity, memory or processing capacity, functionality, or any other suitable loss of performance. The information in the second database may, for example, include usage logs or any other suitable information that includes historical data relating to performance issues associated with the plurality of digital applications. The information may preferably be text-based.

The system may also include a hybrid neural network. The hybrid neural network may include a transformer block neural network. A transformer block neural network may be used herein to refer to a neural network based on the model introduced in the 2017 paper titled "Attention is all you need"[1], the contents of which are hereby incorporated by reference herein in its entirety. Additional information can be found in the article written in 2018 titled "The Illustrated Transformer"[2], as well as the related 2018 article titled "Visualizing A Neural Machine Translation Model (Mechanics of Seq2seq Models With Attention)"[3], the contents of which are hereby incorporated by reference herein in their entireties. Transformer neural networks may typically be used in the context of text translation.

[1] Accessed to https://arxiv.org/abs/1706.03762v5

[2] Accessed at https://jalammar.github.io/illustrated-transformer/

[3] Accessed at https://jalammar.github.io/visualizing-neural-machine-translation-mechanics-of-seq2seq-models-with-attention/

Features of a transformer neural network include the ability to maintain "self-attention" while training and running the model. Self-attention includes the ability to capture track of context (i.e., relationships) between tokens, or portions, of an input, without time-consuming sequential processing. The transformer uses a unique vector-based model for representing the information and the relationships among the information which allows for the input and the context to passed through the model simultaneously. The vector-based model with the embedded context may be referred to as an embedding, and may be generated using a suitable embedding algorithm (e.g., "Word2Vec"[4]).

[4] See, e.g., https://arxiv.org/abs/1301.3781 and https://arxiv.org/abs/1310.4546

An embedding may be a mapping of a discrete-categorical-variable to a vector of continuous numbers. In the context of neural networks, embeddings may be low-dimensional, learned continuous vector representations of discrete variables. Neural network embeddings may be useful because they can reduce the dimensionality of categorical variables and meaningfully represent categories in the transformed space.[5]

[5] See https://towardsdatascience.com/neural-network-embeddings-explained-4d028e6f0526

In a transformer neural network, the vectors may be passed through a series of components that include at least one encoder and at least one decoder. The encoder and decoder may each contain a series of computational layers for processing the input and preparing the output. The encoder may generate a set of vectors from the input. Generating the set of vectors may include multiplying a vector representation of the input by various weighted matrices. The set of vectors may include a query vector (Q), a key vector (K), and a value vector (V), which may be represented as follows:

$$Q^{(h)(x_i)} = W_{h,q}^T x_i$$

$$K^{(h)(x_i)} = W_{h,k}^T x_i$$

$$V^{(h)(x_i)} = W_{h,v}^T x_i$$

$$W_{h,q}, W_{h,k}, W_{h,v} \in R^{d \times k}$$

Passing the vectors through the layers of the transformer may include a layer normalization step that may include applying the LayerNorm equation:

$$LayerNorm(z; \gamma, \beta) = \gamma \frac{(z - \mu_z)}{\sigma_z} + \beta,$$

$$\mu_z = \frac{1}{k}\sum_{i=1}^{k} z_i,\ \sigma_a = \sqrt{\frac{1}{k}\sum_{i=1}^{k}(z_i - \mu_z)^2},$$

Preparing the output may include a normalization step that may includes application of a SoftMax equation. Application of the SoftMax equation may normalize the scores and ensure they are all positive and add up to 1, as follows:

$$\hat{y} = softmax(W_z^T z) = \frac{\exp(W_z^T z)}{\sum_{k=1}^{m} \exp(W_z^T)_k},$$

The hybrid neural network may also include a natural language processing (NLP) engine that is separate from the transformer block neural network. The NLP engine may utilize a model that is not a transformer neural network. The NLP engine may include a graph-based network. In some embodiments, the NLP engine may include a SpaCy™ engine.[6] Spacy Examples may include a ML package to provide NLP entity extraction and linking to identify how words relate to each other and provide a knowledge graph). In some embodiments, the NLP engine may include a pretrained transformer.

[6] See https://spacy.io/ may utilize a model that is not a transformer neural network. The NLP engine may include a graph-based network. In some embodiments, the NLP engine may include a SpaCy™ engine.[6] Spacy Examples may include a ML package to provide NLP entity extraction and linking to identify how words relate to each other and provide a knowledge graph). In some embodiments, the NLP engine may include a pretrained transformer.

The hybrid neural network may be trained by generating a first representation of the information in the first database and generating a second representation of the information in the second database. The first and second representations may include vectors that contain the underlying information. For example, the information may be converted to a character string which may in turn be converted to a vector containing the character string.

The training may also include generating, via an embedding algorithm, a first information vector from the first representation and generating, via the embedding algorithm, a second information vector from the second representation. The first and second information vectors may thereby contain information relating to the set of applications information relating to historical issues associated with the applications, as well as relational information between the above.

The training may also include feeding, using a masking algorithm, the first and the second information vectors to the transformer block neural network. A masking algorithm may include hiding future positions to prevent reverse information flow and biases[7], to produce a more balanced and accurate output.

The training may also include feeding the second representation to the NLP engine. Feeding the second representation to the NLP engine may train the NLP engine, separately from the transformer, to create relationships between applications and historical issues associated with the applications.

In some embodiments, the hybrid neural network may be trained to create relational associations within the plurality of digital applications, within the historical performance issues, and between the historical performance issues and the plurality of digital applications. Utilizing the hybrid neural network (and the transformer component in particular—which is typically used in the entirely different context of text translation) in this manner provides a unique approach for relating digital applications to each other and for predicting issues associated with those digital applications.

The system may be configured to detect a trigger event relating to one of the plurality of digital applications. The trigger event may be an event that may implicate a future potential issue. In some embodiments, the trigger event may be from a list of trigger events that include: a software modification, a hardware modification, a network change, a server change, a new application integration, a threshold data storage level, and a data provider change.

The trigger event may be initiated automatically. For example, the system may receive an automatic notification upon detection of a predefined event. In other embodiments, the trigger event may be initiated manually. For example, a developer may have implemented, or may plan to implement, a code update. The developer may wish to determine what potential issues may arise as a result of the code update. The developer may submit a request for the system to predict potential issues that might arise from the code update. The developer may submit documentation relating to the update to feed as input to the system.

The system may be configured to receive information relating to the trigger event. The information may be part of a document. The information may be text that describes the trigger event. In some embodiments, the information relating to the trigger event may include documentation describing the trigger event or a log describing the trigger event.

The system may be configured to generate a third representation of the information relating to the trigger event, and to generate, via the embedding algorithm, a third information vector from the third representation. The system may be configured to feed the third information vector to the transformer block neural network and receive a first output from the transformer block neural network. The system may be configured to feed the third representation to the NLP engine and to receive a second output from the NLP engine. The system may thereby generate two separate outputs, one from a transformer neural network and one from an NLP engine. The output from the transformer neural network may provide a more global context and the output from the NLP engine may provide a more local context.

The system may be configured to feed the first and the second outputs to a neural collaborative filtering engine. Collaborative filtering systems generally may include techniques for recommender systems that may combine multiple points of view[8]. Neural collaborative filtering engines in particular may utilize neural systems for collaborative filtering[9]. Combining the output from the transformer neural network with the output from the NLP engine may provide increased accuracy by reducing any global or local biases, and by smoothing out any inaccuracies that may be associated with either subsystem. The neural collaborative filtering engine may also provide a ranking of all the potential application failures included in the outputs.

The system may be configured to receive, as output from the neural collaborative filtering engine, a set of predicted application failures.

In some embodiments, the system may be further configured to calculate, for each of the set of predicted application failures, a probability score. The system may transmit an alert to a system supervisor when the probability score of a predicted application failure exceeds a predetermined threshold probability score.

In some embodiments, the system may be further configured to store, in the second database, historical solution data. The historical solution data may include information relating to actions that successfully resolved the historical performance issues. As part of the training, the system may be configured to feed the hybrid neural network with the historical solution data. The system may be configured to receive, as part of the output from the neural collaborative filtering engine, for each of the set of predicted application failures, a recommended action to resolve the predicted application failure.

In some embodiments, the output from the neural collaborative filtering engine may further include a probability score for each of the predicted application failures. The system may be further configured to provide the set of predicted application failures as rows in a table. The rows may be ordered according to the probability scores.

In some embodiments, the output from the neural collaborative filtering engine further may include a plurality of parameters for each of the predicted application failures. The parameters may include: an application identifier; an issue identifier; an indicator representing a source of the failure; and a predicted time of the failure. The table may include a plurality of columns for representing the plurality of parameters.

In some embodiments, the indicator may also represent whether the source of the failure is a human or a non-human source. Determining whether the source of the failure is a human or a non-human source may be helpful in implementing preventative measures going forward.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to training and/or running neural networks. The input/output module may also include one or more speakers for providing audio output and a video display device for providing textual, audio, audiovisual, and/or graphical output. The input and output may be related to computer application functionality. The input and output may be related to training and/or running neural networks.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to training and/or running neural networks.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
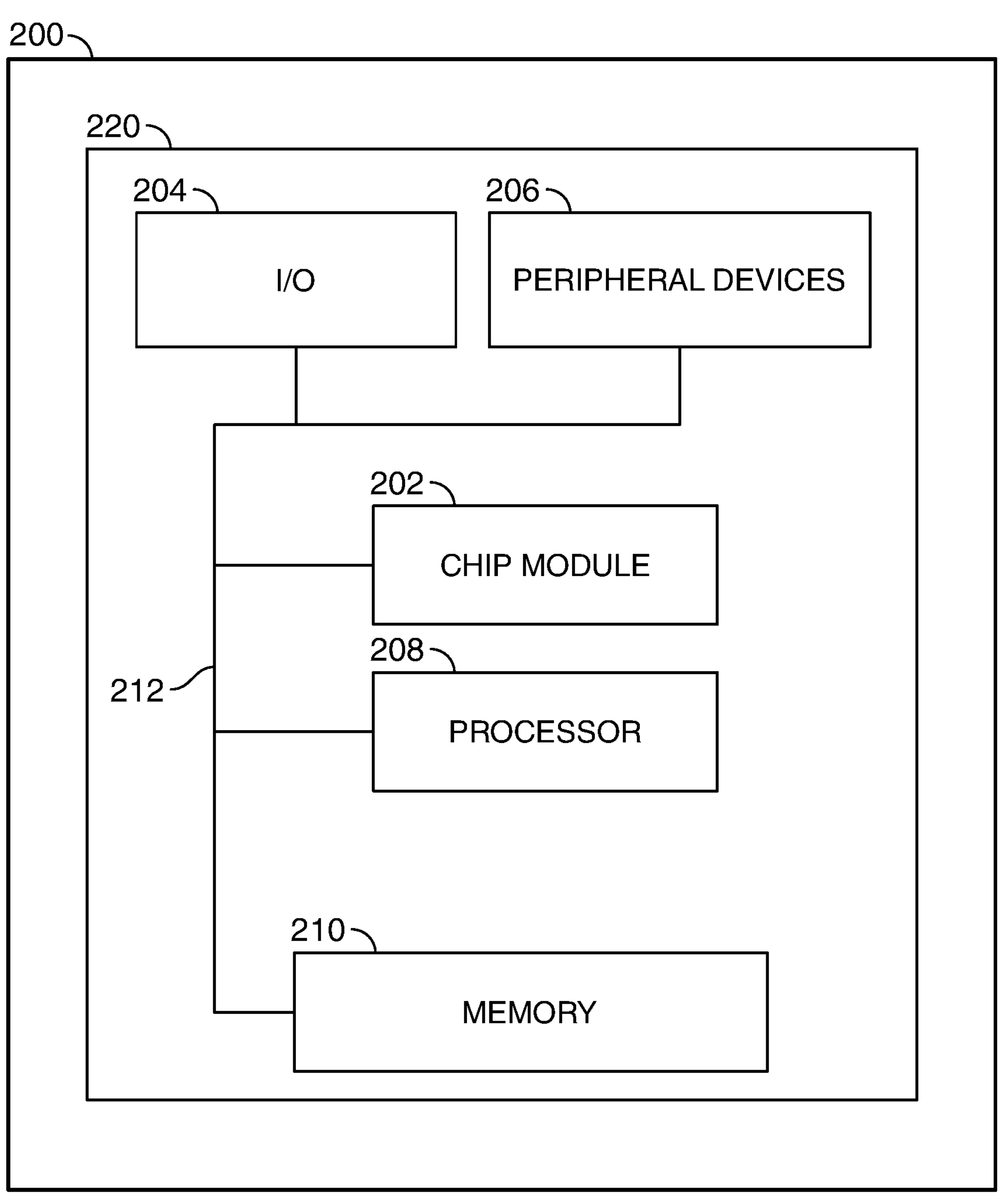
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
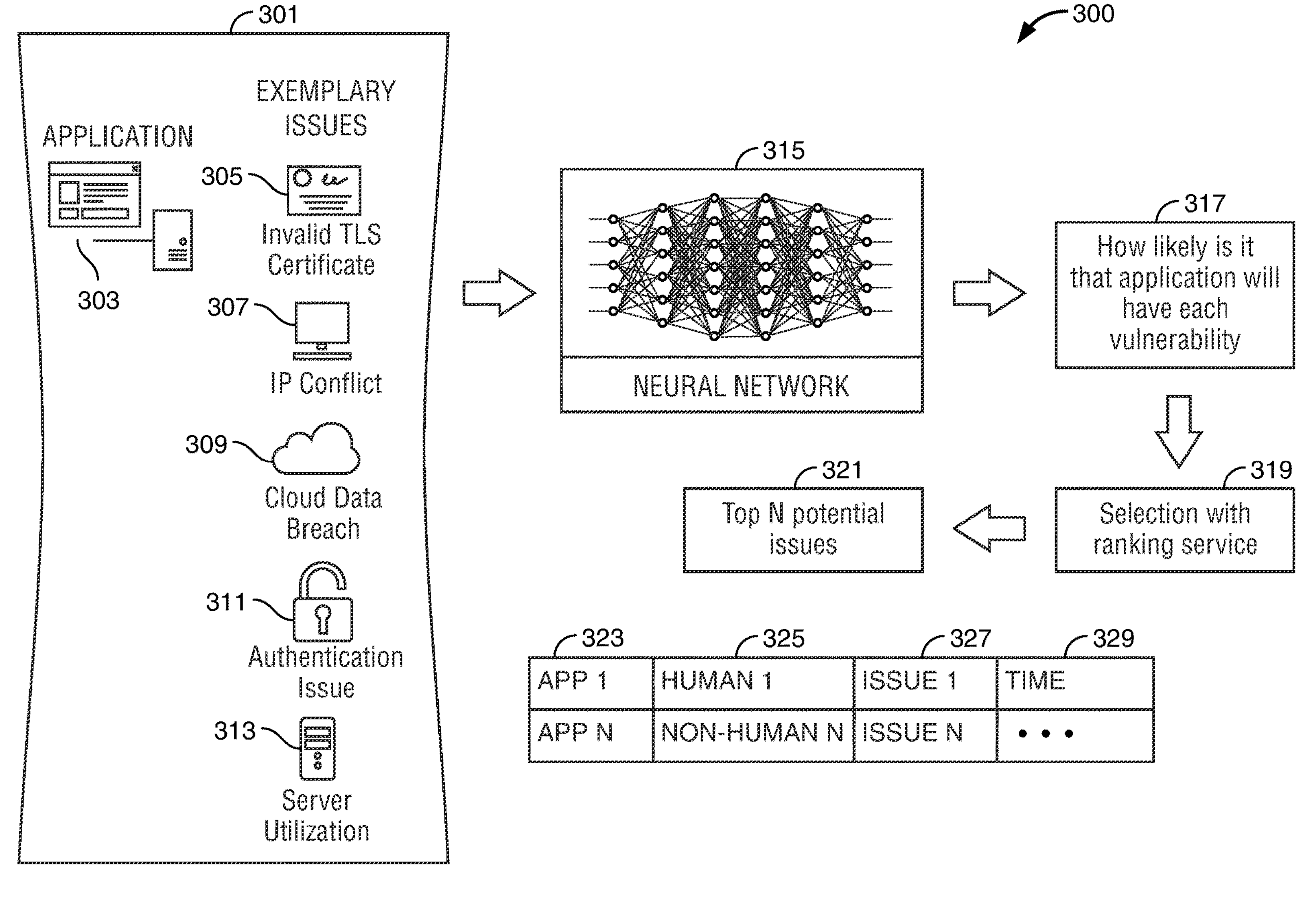
FIG. 3 shows an illustrative diagram in accordance with principles of the disclosure.

FIG. 3 shows illustrative diagram 300 in accordance with principles of the disclosure. Diagram 300 shows system components and process steps using a neural network for predicting application failures. Component 301 shows application 303 and exemplary issues 305-313 that may arise in relation to application 303. Exemplary issues include invalid TLS (Transport Layer Security) certificate 305, IP (Internet Protocol) conflict 307, cloud data breach 309, authentication issue 311, and server utilization 313.

Upon detection of a trigger event, the system may pass information to neural network 315. The neural network may, at 317, calculate a likelihood for each vulnerability in a set of vulnerabilities (e.g., exemplary issues 305-313). For example, the neural network may be trained for a discrete number of vulnerabilities. Upon receipt of an input, the system may calculate a probability for each of those vulnerabilities. At step 319 the system may rank the vulnerabilities. The ranking may follow the calculated probabilities. At 321 the system may display the top N potential issues. The issues may be displayed as rows in a table. The table may include various columns with metrics for each potential issue. For example, column 323 may show which application is vulnerable to the issue. Column 325 may show if the root cause of the issue is human or non-human. The human and/or the non-human may be identified by an ID number. Column 327 may identify the issue. Column 329 may indicate a time at which the potential issue may be predicted to occur.

Figure 4:
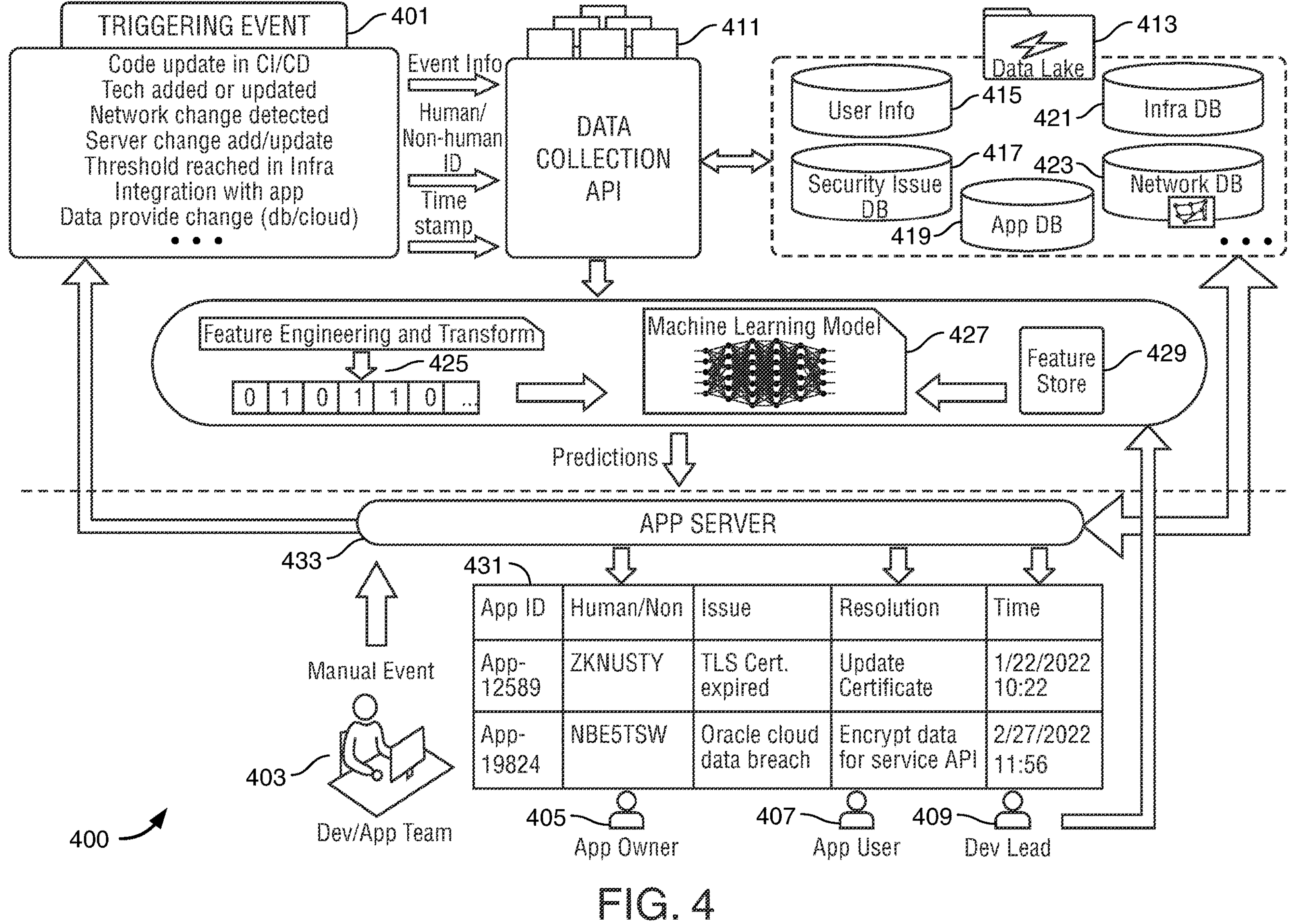
FIG. 4 shows another illustrative diagram in accordance with principles of the disclosure.

FIG. 4 shows illustrative diagram 400 in accordance with principles of the disclosure. Diagram 400 shows system components and process steps using a neural network for predicting application failures. At step 401 a trigger event is detected. Example trigger events include a code update. The code update may, for example, be part of a CI/CD (continuous integration and continuous deployment, which may refer to a series of steps that must be performed in order to deliver a new version of software) pipeline. Trigger events may also include new or updated technology, network change, server change, add, or update, maximum threshold reached in infrastructure (e.g., maximum utilization reached or exceeded), integration with an application, change in data provider for a database and/or cloud, or any other suitable event that may increase the potential for a system failure.

Data may be passed to a data collection API (Application Programming Interface) at step 411. The data may be training data. The data may include event information, identification of human or non-human source of the event, and a time stamp of the events. Training data fed into the system may also be provided from data lake 413. The data in the data lake may include historical data relating to applications and issues associated with the applications. For example, the data may include user information 415, security issue database 417, application database 419, infrastructure database 421, and network database 423. The data in the database may include information relating to applications, including developers of the applications, and issues that have arisen in association with the applications. This data may be used to train ML model 427 using various vectors and feature transforms, as described in detail elsewhere herein. The trained features may be stored in feature store 429.

Using the aforementioned data to train ML model 427 may provide a model that is able to track relationships between historical issues with an application, a user or developer or general information of an application, and from similar/correlated applications and user/developers as well. For example, the ML model may create relationships and store a close distance between a particular developer of a first application and the same developer of a second application. If the developer made a mistake and caused an application failure with the first application, the system may calculate a high probability of the same developer causing a failure when they update the second application.

Diagram 400 shows an illustrative example of a manual trigger event according to aspects of the disclosure. Developer/application team 403 may include application owner 405, application user 407, and developer lead 409. Any one of the team may submit a request for a prediction from the system. The request may be submitted along with documentation of the event for which the prediction is sought. The request may be submitted via app server 433 which may generate the appropriate input form and feed the input to ML model 427. The model may generate output 431, which may be a table whose rows represent a list of various potential issues. Columns of the table may display information relating to the potential issues, such as app ID, source of the issue, a description of the issue, a recommended resolution (which may be a preventative measure), and a time for the potential issue.

Figure 5:
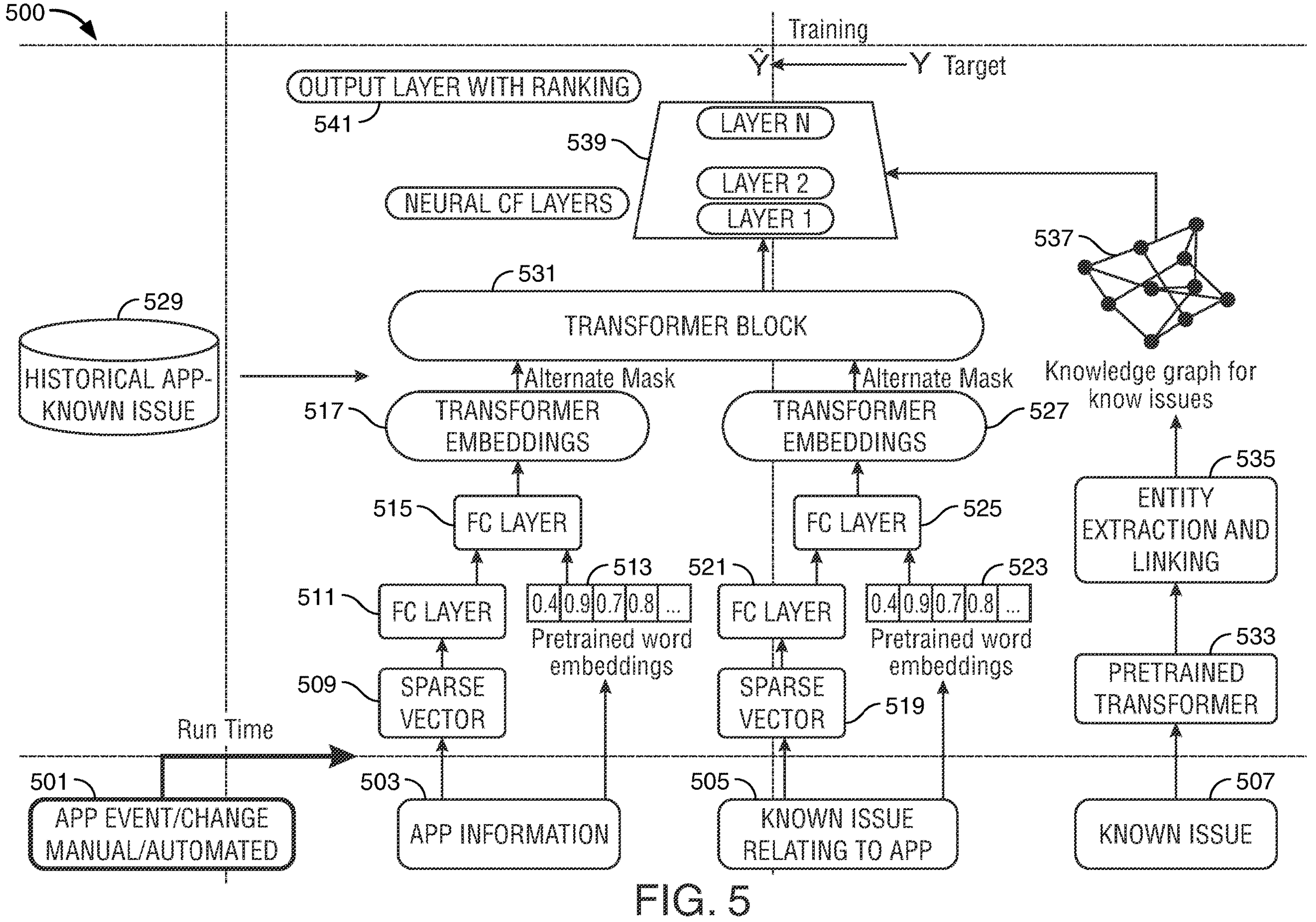
FIG. 5 shows yet another illustrative diagram in accordance with principles of the disclosure.

FIG. 5 shows illustrative diagram 500 in accordance with principles of the disclosure. Diagram 500 shows trigger event 501, which may be automatically or manually submitted. Documentation of the trigger event may be passed to the hybrid neural network (i.e., transformer block 531 and/or knowledge graph 537) in accordance with principles of the disclosure.

The hybrid neural network may be trained and/or run with some or all of the steps shown and described in diagram 500. Application information 503 may be passed as a vector (e.g., sparse vector 509) to a layer (e.g., fully connected layer 511) of a transformer neural network. A sparse vector may be an information vector designed to increase accuracy by using a frequency algorithm, such as TFID (term frequency inverse document frequency) or count vectorizer (which may be less accurate but less time intensive).

The output from layer 511 may be passed along with pretrained word embeddings 513 to second layer 515. The pretrained word embeddings may be tweaked, fine-tuned, and updated as part of the training process. The output may include embeddings 517 which may be passed to transformer block 531. Embeddings 517 may be passed to the transformer block with masking along with embedding 527. Embedding 527 may be generated from known issues data 505 using elements 519-525, in a similar fashion as embeddings 517 was created from app information 505 using elements 509-515.

Additionally, known issue data 507 (which may, in certain embodiments, be substantially similar to known issues data 505) may be passed to a separate ML model. The separate ML model may include pretrained transformer 533. Training (which may include further training, or fine-tuning, in the case of a pretrained model) the ML model may include entity extraction and linking to produce knowledge graph 537.

At runtime, the system may be fed the input from trigger event 501 to transformer block 531 and to knowledge graph 537. The outputs may be fed together to neural collaborative filtering layers 539 to produce ranked output 541.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for hybrid neural networks with multi-threaded inputs are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for predicting application failures using a hybrid neural network with multi-threaded inputs, the method comprising:

storing, in a first database, information relating to a plurality of digital applications;

storing, in a second database, information relating to historical performance issues associated with the plurality of digital applications;

training the hybrid neural network, the hybrid neural network comprising a transformer block neural network and a natural language processing (NLP) engine that is separate from the transformer block neural network, wherein said training comprises:

generating a first representation of the information in the first database;

generating a second representation of the information in the second database;

generating, via an embedding algorithm, a first information vector from the first representation;

generating, via the embedding algorithm, a second information vector from the second representation;

feeding, using a masking algorithm, the first and the second information vectors to the transformer block neural network; and feeding the second representation to the NLP engine;

detecting a trigger event relating to one of the plurality of digital applications;

receiving information relating to the trigger event;

generating a third representation of the information relating to the trigger event;

generating, via the embedding algorithm, a third information vector from the third representation;

feeding the third information vector to the transformer block neural network;

receiving, as a result of feeding the third information vector to the transformer block neural network, a first output from the transformer block neural network;

feeding the third representation to the NLP engine;

receiving, as a result of feeding the third representation to the NLP engine, a second output from the NLP engine;

feeding the first and the second outputs to a neural collaborative filtering engine; and receiving, as output from the neural collaborative filtering engine, a set of predicted application failures.

2. The method of claim 1 further comprising training the hybrid neural network to create relational associations within the plurality of digital applications, within the historical performance issues, and between the historical performance issues and the plurality of digital applications.

3. The method of claim 1 further comprising:

calculating, for each of the set of predicted application failures, a probability score; and transmitting an alert to a system supervisor when the probability score of a predicted application failure exceeds a predetermined threshold probability score.

4. The method of claim 1 further comprising:

storing, in the second database, historical solution data, said historical solution data comprising information relating to actions that successfully resolved the historical performance issues;

as part of the training, feeding the hybrid neural network with the historical solution data; and receiving, as part of the output from the neural collaborative filtering engine, for each of the set of predicted application failures, a recommended action to resolve the predicted application failure.

5. The method of claim 1 wherein:

the output from the neural collaborative filtering engine further comprises a probability score for each of the predicted application failures; and the method further comprises providing the set of predicted application failures as rows in a table, wherein the rows are ordered according to the probability scores.

6. The method of claim 5 wherein:

the output from the neural collaborative filtering engine further comprises a plurality of parameters for each of the predicted application failures, the parameters comprising:

an application identifier;

an issue identifier;

an indicator representing a source of the failure; and a predicted time of the failure; and the table comprises a plurality of columns for representing the plurality of parameters.

7. The method of claim 6 wherein the indicator also represents whether the source of the failure is a human or a non-human source.

8. The method of claim 1 wherein the NLP engine comprises a SpaCy™ engine.

9. The method of claim 1 wherein the trigger event is from a list of trigger events that comprises a software modification, a hardware modification, a network change, a server change, a new application integration, a threshold data storage level, and a data provider change.

10. The method of claim 1 wherein the information relating to the trigger event comprises documentation describing the trigger event or a log describing the trigger event.

11. A hybrid neural network system with multi-threaded inputs for predicting application failures, the system comprising:

a first database configured to store information relating to a plurality of digital applications;

a second database configured to store information relating to historical performance issues associated with the plurality of digital applications; and a hybrid neural network comprising:

a transformer block neural network; and a natural language processing (NLP) engine that is separate from the transformer block neural network;

wherein:

the hybrid neural network is trained by:

generating a first representation of the information in the first database;

generating a second representation of the information in the second database;

generating, via an embedding algorithm, a first information vector from the first representation;

generating, via the embedding algorithm, a second information vector from the second representation;

feeding, using a masking algorithm, the first and the second information vectors to the transformer block neural network; and feeding the second representation to the NLP engine; and the system is configured to:

detect a trigger event relating to one of the plurality of digital applications;

receive information relating to the trigger event;

generate a third representation of the information relating to the trigger event;

generate, via the embedding algorithm, a third information vector from the third representation;

feed the third information vector to the transformer block neural network;

receive, as a result of feeding the third information vector to the transformer block neural network, a first output from the transformer block neural network;

feed the third representation to the NLP engine;

receive, as a result of feeding the third representation to the NLP engine, a second output from the NLP engine;

feed the first and the second outputs to a neural collaborative filtering engine; and receive, as output from the neural collaborative filtering engine, a set of predicted application failures.

12. The system of claim 11 wherein the hybrid neural network is trained to create relational associations within the plurality of digital applications, within the historical performance issues, and between the historical performance issues and the plurality of digital applications.

13. The system of claim 11 further configured to:

calculate, for each of the set of predicted application failures, a probability score; and transmit an alert to a system supervisor when the probability score of a predicted application failure exceeds a predetermined threshold probability score.

14. The system of claim 11 further configured to:

store, in the second database, historical solution data, said historical solution data comprising information relating to actions that successfully resolved the historical performance issues;

as part of the training, feed the hybrid neural network with the historical solution data; and receive, as part of the output from the neural collaborative filtering engine, for each of the set of predicted application failures, a recommended action to resolve the predicted application failure.

15. The system of claim 11 wherein:

the output from the neural collaborative filtering engine further comprises a probability score for each of the predicted application failures; and the system is further configured to provide the set of predicted application failures as rows in a table, wherein the rows are ordered according to the probability scores.

16. The system of claim 15 wherein:

the output from the neural collaborative filtering engine further comprises a plurality of parameters for each of the predicted application failures, the parameters comprising:

an application identifier;

an issue identifier;

an indicator representing a source of the failure; and a predicted time of the failure; and the table comprises a plurality of columns for representing the plurality of parameters.

17. The system of claim 16 wherein the indicator also represents whether the source of the failure is a human or a non-human source.

18. The system of claim 11 wherein the NLP engine comprises a SpaCy™ engine.

19. The system of claim 11 wherein the trigger event is from a list of trigger events that comprises a software modification, a hardware modification, a network change, a server change, a new application integration, a threshold data storage level, and a data provider change.

20. The system of claim 11 wherein the information relating to the trigger event comprises documentation describing the trigger event or a log describing the trigger event.

* * * * *